United States Patent [19]
Dean et al.

[11] 3,904,478
[45] Sept. 9, 1975

[54] IMMOBILIZED CO-ENZYMES

[76] Inventors: Peter Duncan Goodearl Dean, 43 Redgate, Formby, Lancashire; David Barry Craven, 18 Eversley Park, Storeton Rd., Oxton, Birkenhead, Cheshire, both of England

[22] Filed: Oct. 15, 1973

[21] Appl. No.: 406,663

[30] Foreign Application Priority Data
Oct. 17, 1972 United Kingdom............... 47822/72

[52] U.S. Cl.................... 195/63; 195/66 R; 195/68; 195/DIG. 11; 260/211.5 R
[51] Int. Cl............................................... C07g 7/02
[58] Field of Search .......... 195/63, 68, DIG. 11, 62, 195/28 X, 66 R; 260/211.5 R; 424/94

[56] References Cited
OTHER PUBLICATIONS

Larsson et al., Preparation of a NAD(H)–Polymer Matrix Showing Coenzymic Function of the Bound Pyridine Nucleotide, Biotechnology and Bioengineering, Vol. XIII 1971 (pp. 393–398).
Lowe et al., Affinity Chromatography of Enzymes on Insolubilized Cofactors, FEBS Letters, Vol. 14, No. 5, 1971 (pp. 313–316).
Penzer, et al., Flavins In a Solid Matrix, Nature, Jan. 1967 (pp. 251–253) Q1N2.
Harpold et al., AMP on an Insoluble Solid Support, Nature, Aug. 1968 (R486) Q1N2.
Weibel et al., Insolubilized Coenzymes, Biochemical and Biophysical Research Communications, Vol. 44, No. 2, 1971 (pp. 347–352) QP501B43.

*Primary Examiner*—David M. Naff
*Attorney, Agent, or Firm*—Johnston, Keil, Thompson & Shurtleff

[57] ABSTRACT

A reactive matrix comprising a co-enzyme chemically attached to a water insoluble support material is produced by reacting a thio derivative of the co-enzyme in which an amino group on the co-enzyme has been replaced by a thio group, with
a. a bifunctional organic compound having a nucleophilic group so as to couple the bifunctional organic compound to the co-enzyme and then coupling the resultant co-enzyme reaction product to a water insoluble support material through the unreacted functional group of the bifunctional organic compound or
b. a water insoluble support material having a plurality of pendant nucleophilic groups so as to couple the co-enzyme to the support material.

6 Claims, No Drawings

IMMOBILIZED CO-ENZYMES

This invention relates to the separation of mixtures containing enzymes.

In the separation and purification of crude mixtures containing enzymes together with other organic materials, it has been proposed to use the technique of affinity chromatography, in which a substrate for one of the enzymes is attached to an insoluble polymeric support material such as cellulose, and the mixture containing the enzyme is contacted with the insolubilised substrate. The enzyme becomes temporarily attached to the substrate, the support material is washed free of contaminants, and subsequently treated to recover the enzyme. This process works well in practice but suffers from the disadvantage that only a single enzyme can be removed from the mixture at any one time. As a consequence the separation of complex mixtures containing a number of enzymes can be a laborious and time consuming procedure.

In U.S. Pat. application Ser. No. 224528, filed Feb. 8, 1972, now abandoned, there is described and claimed a reactive matrix comprising a co-enzyme chemically attached to a water insoluble organic polymeric support material and also a process for the separation of mixtures containing a plurality of enzymes which comprises contacting the enzyme mixture in solution with the reactive matrix, so that the enzymes become attached to the support, removing the support from the solution and eluting the enzymes sequentially from the support.

The present invention provides a process for the production of a highly versatile reactive matrix comprising a co-enzyme chemically attached to a water insoluble support material having an improved binding capacity.

According to the present invention a process for the production of a reactive matrix comprising a coenzyme chemically attached to a water insoluble support material comprises reacting a thio derivative of the co-enzyme in which an amino group on the co-enzyme has been replaced by a thio group, with a. a bifunctional organic compound having a nucleophilic group so as to couple the bifunctional organic compound to the co-enzyme and then coupling the resultant co-enzyme reaction product to a water insoluble support material through the unreacted functional group of the bifunctional organic compound or b. a water insoluble support material having a plurality of pendant nucleophilic groups so as to couple the co-enzyme to the support material.

The invention may be applied to a variety of naturally occurring co-enzymes, and also to fragments, analogues and derivatives of naturally occurring co-enzymes having co-enzyme activity. All these compounds are in this specification included in the term "co-enzyme." Among the naturally occurring co-enzymes which may be used there may be mentioned, for example, nicotinamide adenine dinucleotide (NAD), nicotinamide adenine dinucleotide phosphate (NADP) and their reduced forms, nicotinamide mononucleotide (NMN), adenosine diphosphate ribose (ADP-ribose), adenosine triphosphate (ATP), adenosine diphosphate (ADP), an adenosine monophosphate (AMP), pyridoxamine phosphate, a pterin, or a nucleoside phosphate. Fragments of co-enzymes having co-enzyme activity which may be used include, for example, nucleosides containing a purine or pyrimidine ring, and phosphate-containing organic molecules, such as for example, pyridoxamine phosphate, acetyl phosphate, creative phosphate, sugar phosphates such as glucose-6-phosphate, phospho-amino acids, alcohol phosphates, such as 6-aminohexan-1-ol phosphate, nucleoside phosphates, phospholipids, and pyrophosphates.

Thio derivatives of the co-enzyme which may be used in the process of the invention include thiol, thioether, thioester, disulphide, sulphonyl halides, sulphonic acids, sulphonic esters and alkyl sulphonyl and sulphone derivatives. These may be prepared by standard methods, for example the thio derivative to adenosine mono-phosphate (AMP) may be prepared by reacting inosine mono-phosphate with $P_2S_5$ after protecting the -OH groups with acetonide or an acetate. In general, the replacement of the amino group on the co-enzyme by a thio group may be accomplished by similar indirect methods.

The bifunctional organic compound which is coupled to the co-enzyme in procedure (a) contains a nucleophilic group which can react with the thio group on the co-enzyme to form a covalent bond. Preferably the nucleophilic group is a nitrogen-containinig group, for example an amino group. The bifunctional organic compound also contains a group through which the co-enzyme can be coupled to a support material, and this may be an amino group, or a hydroxyl, ester, or other suitable functional group. Preferably the bifunctional organic compound is an aliphatic or aromatic diamine, and most preferably an alkylamine having a chain of from 2 to 12 carbon atoms between the amino groups, for example, 1,6-hexane diamine, 1,8-octane-diamine and 1,12-dodecane-diamine. The bifunctional compound may also be an $\alpha$, $\beta$, $\gamma$ or $\omega$-amino acid, for example $\epsilon$-amino caproic acid. The reaction of the bifunctional organic compound with the thio derivative of the co-enzyme may be carried out of aqueous or alcoholic solution, preferably at a temperature of from 70° to 90°C.

The support material is one which will be insoluble under the conditions of use of the co-enzyme and may be an organic or inorganic material. Thus the support material may be a natural or synthetic polymeric material, particularly a hydrophilic material for example a polymer having free hydroxyl groups such as cellulose, a cellulose derivative such as carboxymethyl cellulose, diethylaminoethyl cellulose, phosphocellulose and acyl hydrazide cellulose; starch; a dextran or cross-linked dextran such as "Sephadex" (Trademark), an agarose such as Sepharose (Trademark), aminohexyl-Sepharose, and phosphohexyl-Sepharose; agar and agar derived polymers; a polyvinyl alcohol; a polyacrylamide; a nylon; a polyester such as polyethyleneterephthalate; cellulose acetate; and substituted cross-linked polystyrenes such as chloromethylated polystyrene. Inorganic supports which may be used include for example glasses and aluminium silicates.

The insoluble support material may take the form of beads, or a sheet of fabric for example a woven fabric or any other convenient cast or extruded shape. Preferably it is produced in the form of a permeable material which is adapted to make up a packed column.

The reaction product of the co-enzyme and the bifunctional compound may be attached to the polymeric material by a variety of chemical techniques. Azide groups or chloro-s-triazinyl groups may be formed on the polymeric matrix which will react directly with the unreacted functional group of the bifunctional compound without affecting the ability of the co-enzyme to attach itself to an enzyme molecule. In a particularly preferred technique, cellulose, a cellulose derivative, or other polymeric material containing a plurality of vicinal diol groups is treated with cyanogen bromide and then with the above mentioned reaction product according to the following scheme:

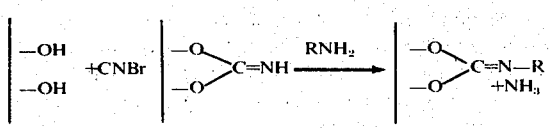

In the above reaction scheme the unreacted group of the bifunctional compound is illustrated as an amino group and RNH$_2$ represents the co-enzyme -bifunctional compound reaction product.

In the alternative procedure (b) the thio derivative of the co-enzyme is reacted with a polymer having pendant nucleophilic groups. These are preferably nitrogen-containing groups, and most preferably amino or alkylamino groups.

The novel reactive matrices of the present invention may be employed in any of the processes described in U.S. application Ser. No. 224528, filed Feb. 8, 1972, now abandoned. Mixtures of enzymes may be separated from other organic materials and from one another by simple elution techniques.

The invention is illustrated by the following Example:

EXAMPLE

This Example describes the production of insolubilised adenosine monophosphate (AMP). 6-mercaptopurineriboside-5'-phosphate is prepared by reacting inosine monophosphate with P$_2$S$_5$ after protecting the -OH groups with acetate. 6-Mercaptopurineriboside-5'-phosphate barium salt (7 mg) and 7 ml of a 40 percent aqueous solution of 1,6-hexanediamine are introduced into a thick Pyrex glass ampoule. The ampoule is sealed and then heated at 70° to 80°C for approximately 16 hours. The ampoule is then opened, the solution frozen in a beaker and then freeze dried. The resulting residue is redissolved in approximately 20 ml H$_2$O and freeze dried again. This process was repeated once more to give a residue almost free of unreacted diamine.

The product is further purified by preparative TLC on cellulose (binder free) using 95 percent ethanol: 1M ammonium acetate, pH 7.5 in the ratio 7:3 as the solvent system.

The U.V. (254 cm$^{-1}$) absorbing band is scraped off, the derivative eluted with water and recovered by freeze drying. This is coupled to 2 g Sepharose activated with 0.5 g of cyanogen bromide, by reaction in pH 10.0, 0.1M sodium bicarbonate buffer overnight at 4°. 90 percent of the derivative is bound in this manner.

The insolubilised AMP preparation is an admirable affinity chromatography support for the purification of crude dehydrogenase extracts. This is shown by the following results obtained for pure enzyme heavily adulterated with bovine serum albumin:

| Enzyme | Concentration of salt required to elute BSA | Concentration of salt required to elute enzyme |
|---|---|---|
| Lactate DH (muscle) | 10 millimolar phosphate pH 7.5 | more than 1 molar potassium chloride. |
| Lactate DH (heart) | '' | 5 millimolar NADH will elute enzyme in presence of 1 molar potassium chloride |
| Glucose-6-Phosphate DH (yeast) | '' | 10 millimolar phosphate pH 7.5 |
| Alcohol DH (yeast) | '' | 405 millimolar potassium chloride. |

We claim:

1. A process for the production of a reactive matrix comprising a co-enzyme or fragment of a co-enzyme having co-enzyme activity chemically attached to a water insoluble support material which comprises reacting a thio derivative of the co-enzyme or said fragment of a co-enzyme, in which an amino group on the co-enzyme or said fragment of a co-enzyme has been replaced by a thio group, with a bifunctional organic compound having a nucleophilic group so as to couple the bifunctional organic compound to the co-enzyme or said co-enzyme fragment and then coupling the resultant co-enzyme or said co-enzyme fragment reaction product to a water insoluble support material through the unreacted functional group of the bifunctional organic compound, said co-enzyme being selected from the group consisting of nicotinamide adenine dinucleotide (NAD), nicotinamide adenine dinucleotidephosphate (NADP), or their reduced forms, nicotinamide mononucleotide (NMN), adenosine diphosphate ribose (ADP-ribose) adenosine triphosphate (ATP), adenosine diphosphate (ADP), an adenosine monophosphate (AMP), pyridoxamine phosphate, a pterin, and a nucleoside phosphate, and said fragments of a co-enzyme being selected from the group consisting of a nucleoside containing a purine or pyrimidine ring or a phosphate-containing organic molecule, said thiol derivative being selected from the group consisting of a thiol, thioether, thioester, disulphide, sulphonyl halide, sulphonic acid, sulphonic ester, or alkyl sulphonyl or sulphone, said bifunctional organic compound being selected from the group consisting of aliphatic and aromatic diamines and aliphatic bifunctional amino acids, the aliphatic diamines having a chain of from 2 to 12 carbon atoms between the amino groups, the reaction of the bifunctional organic compound with the thio derivative of said co-enzyme or said co-enzyme fragment being carried out in aqueous or alcoholic solution at a temperature of from 70° to 90°C., said water insoluble support being a natural or synthetic organic polymeric support material comprising a plurality of vicinal diol groups reacted with cyanogen bromide and the co-enzyme or said co-enzyme fragment reaction product being coupled to the cyanogen bromide reacted support material through the unreacted functional group of the bifunctional organic compound.

2. A process as claimed in claim 1 in which said organic polymeric support material is selected from the group consisting of a cellulose, a dextran, or an agarose.

3. A process as claimed in claim 1 in which said organic polymeric support material is an agarose.

4. A process as claimed in claim 1 in which said co-enzyme is adenosine monophosphate, said thio derivative is 6-mercaptopurineriboside-5'-phosphate, said bifunctional organic compound is 1,6-hexanediamine, and said organic polymeric support material comprising a plurality of vicinal diol groups is an agarose.

5. An insolubilized co-enzyme obtained by the process of claim 1.

6. An insolubilized co-enzyme obtained by the process of claim 4.

* * * * *

UNITED STATES PATENT AND TRADEMARK OFFICE
CERTIFICATE OF CORRECTION

PATENT NO. : 3,904,478
DATED : September 9, 1975
INVENTOR(S) : PETER DUNCAN GOODEARL DEAN and DAVID BARRY CRAVEN It is certified that error appears in the above-identified patent and that said Letters Patent are hereby corrected as shown below:

Column 2, line 13, "to" should read --of--.

Column 2, line 38, "of", second occurrence, should read --in--.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*